United States Patent [19]

Mayer et al.

[11] Patent Number: 5,322,866

[45] Date of Patent: Jun. 21, 1994

[54] METHOD OF PRODUCING BIODEGRADABLE STARCH-BASED PRODUCT FROM UNPROCESSED RAW MATERIALS

[75] Inventors: Jean M. Mayer, N. Smithfield, R.I.; Mark J. Hepfinger, Holliston; Elizabeth A. Welsh, Westborough, both of Mass.

[73] Assignee: The United States of America as represented by the Secretary of the Army, Washington, D.C.

[21] Appl. No.: 10,735

[22] Filed: Jan. 29, 1993

[51] Int. Cl.⁵ .............................................. B29C 49/00
[52] U.S. Cl. ........................................ 524/47; 524/52; 524/394; 524/451
[58] Field of Search .................. 524/47, 52, 394, 451; 264/565, 563

[56] References Cited

U.S. PATENT DOCUMENTS

| | | | |
|---|---|---|---|
| 3,661,154 | 5/1972 | Torr | 128/284 |
| 4,016,117 | 4/1977 | Griffin | 524/47 |
| 4,021,388 | 5/1977 | Griffin | 524/52 |
| 4,172,054 | 10/1979 | Ogawa et al. | 524/47 |
| 4,218,350 | 8/1980 | Griffin | 524/47 |
| 4,324,709 | 4/1982 | Griffin | 523/210 |
| 4,337,181 | 6/1982 | Otey et al. | 523/128 |
| 4,454,268 | 6/1984 | Otey et al. | 524/47 |
| 4,536,532 | 8/1985 | Miller et al. | 524/141 |
| 4,722,815 | 2/1988 | Shibanai | 264/117 |
| 4,725,657 | 2/1988 | Shibanai | 523/210 |
| 4,839,450 | 6/1989 | Fanta et al. | 527/313 |
| 4,891,404 | 1/1990 | Narayan et al. | 525/54.2 |
| 4,957,790 | 9/1990 | Warren | 428/34.9 |
| 4,975,469 | 12/1990 | Jacoby et al. | 521/84.1 |
| 4,983,651 | 1/1991 | Griffin | 524/47 |
| 5,051,266 | 9/1991 | Juhl et al. | 426/129 |
| 5,056,931 | 10/1991 | Williams | 383/8 |
| 5,070,122 | 12/1991 | Vanderbilt et al. | 524/47 |
| 5,078,667 | 1/1992 | Williams | 493/195 |
| 5,087,650 | 2/1992 | Willett | 524/47 |
| 5,091,262 | 2/1992 | Knott et al. | 428/516 |
| 5,095,054 | 3/1992 | Lay et al. | 524/47 |
| 5,106,545 | 4/1992 | Warren | 264/22 |
| 5,108,807 | 4/1992 | Tucker | 428/35.2 |
| 5,111,933 | 5/1992 | Di Biasi et al. | 206/223 |
| 5,112,903 | 5/1992 | Sakakibara et al. | 525/54.2 |
| 5,115,000 | 5/1992 | Jane et al. | 524/47 |
| 5,126,109 | 6/1992 | Saitoh | 422/40 |

OTHER PUBLICATIONS

Stenhouse et al., "Blown Film From Starch/Poly (Vinyl Alcohol) and Starch/Ethylene-Vinyl Alcohol Blends," Am. Chem. Soc. Preprint 33: 532–533, (Aug. 17, 1992).

Pool, "Wooden You Love Biodegradable Plastics?," Science 257: 1479–1480 Sep. 1992.

*Primary Examiner*—John Kight, III
*Assistant Examiner*—Jeffrey Culpeper Mullis
*Attorney, Agent, or Firm*—Richard J. Donahue

[57] ABSTRACT

This invention discloses a method of preparing and extruding biodegradable starch blends into biodegradable products in such a way that preprocessing steps, such as gelatinizing or destructurizing of the starch, are not required. Unprocessed raw starch is combined with biodegradable copolymers such as polyvinyl alcohol (PVOH), or ethylene vinyl alcohol (EVOH), a nucleating agent, and a plasticizer. The combination may be processed using a twin-screw mixer, and blown into a film. The method described in this invention alleviates pre-preparation steps, reduces the cost and time required to prepare and extrude starch-based biodegradable materials, eliminates the need to use expensive pre-processed starch, and results in a substantially completely biodegradable product.

8 Claims, No Drawings

METHOD OF PRODUCING BIODEGRADABLE STARCH-BASED PRODUCT FROM UNPROCESSED RAW MATERIALS

The invention described herein may be manufactured, used and licensed by or for the Government for Governmental purposes without the payment to us of any royalty thereon.

FIELD OF THE INVENTION

The invention relates to the preparation of starch-based biodegradable products and more particularly to processes of manufacturing substantially completely biodegradable blown films from unprocessed raw starch.

BACKGROUND OF THE INVENTION

Waste disposal has become increasingly problematic in recent years, and plastic packaging is perceived to be a major contributor to the problem. The availability of landfill space is decreasing, and international restrictions on the disposal of plastics at sea will be imposed in 1994. According to some estimates, conventional plastics require hundreds of years to decompose. In response to these concerns, there has been much activity in recent years in the development of biodegradable packaging materials. Polymers such as chitosan, polyvinyl alcohol (PVOH) and polyhydroxybutyrate-co-hydroxyvalerate have been investigated for these applications.

Many attempts have been made to produce biodegradable films from petroleum and cellulose derived materials. None has been completely successful because either they are too costly or decompose too slowly for most applications. Starch is probably the most abundant, low-cost, biodegradable polymer available, and its use in plastic film production could greatly reduce the demand for petrochemicals and the harmful impact on the environment caused by discarding nonbiodegradable plastic films.

As described in U.S. Pat. No. 4,673,438 to Wittwer et al., and U.S. Pat. Nos. 4,133,784, 4,337,181, and 4,454,268 to Otey et al., many starch-based biodegradable formulations use starch that has first been "destructurized" or "gelatinized". Destructurization or gelatinization is accomplished by heating the raw starch granules in the presence of water under elevated pressure. This treatment produces a disordering of the starch granules and allows the starch to be more effectively blended in conventional processing and production steps. However, destructurizing or gelatinizing the starch requires an additional pass through an extruder which increases the time and cost required to make starch-based biodegradable articles.

Starch must be combined with other materials (copolymers) in order to produce a satisfactory extruded film because extrusion of starch alone produces a brittle, water-sensitive foam. Addition of polyethylene or polypropylene are known to add water stability, elasticity, and toughness to processed starch-filled films. Unfortunately, polyethylene and polypropylene are compounds which have been shown not to be biodegradable. As a result, only the starch portion of the composite film biodegrades while the remaining copolymers remain intact. In U.S. Pat. No. 5,087,650 to Willett et al., for example, olefins such as ethylene and propylene are copolymerized with comonomers such as methyl acrylate, ethyl acrylate, and hexyl acrylate to produce a graft copolymer which is then combined with starch. The graft copolymer is not biodegradable, and thus the final product is actually only partially biodegradable due to decomposition of the starch component.

Conventional preparation of starch-based films, such as that described in U.S. Pat. No. 4,337,181 to Otey et al., requires a multiple step process in which starch is gelatinized, combined with pellets of nonbiodegradable copolymer, and processed into a film or other shaped article using a single screw extrusion process. In the process described in U.S. Pat. No. 5,087,650 to Willett, a starch-based "masterbatch" is formed by combining starch with copolymers, chopping the masterbatch extrudate into pellets, then blending the masterbatch pellets with polyolefins such as polyethylene or polypropylene which then can be injection molded or blown into film. Due to the fixed proportion of starch and copolymer in the pellets utilized in the prior art, ratios of starch and copolymer are not easily tailored to specific product requirements. Therefore, production of biodegradable starch-based products with different ratios of starch and copolymer are not easily manufactured. Furthermore, these conventional techniques of producing a starch-based film require additional steps that take extra time and add to the cost of the final articles.

SUMMARY OF THE INVENTION

The present invention provides for an improved process of manufacturing biodegradable products from unprocessed raw starch materials and biodegradable copolymers. This process improves existing manufacturing techniques by utilizing unprocessed raw starch materials that have not been pretreated or prepelletized, thus allowing for production of final products from the raw materials directly. This simplified process reduces the number of manufacturing steps, lowers the cost and time required to produce the product, allows for on-site changes to formulations optimized for given product applications where biodegradable products are desired, and allows for substantially complete biodegradablility of the final product. In one embodiment, unprocessed raw starch is mixed directly with a biodegradable copolymer powder, lubricant, plasticizer, and water, and the resulting mixture is blown into a film. In a second embodiment, a twin screw mixer is used to continuously combine unprocessed raw starch, biodegradable copolymer powder, lubricant, plasticizer, and water. The resulting mixture then is continuously processed into a blown film. In either embodiment, the resultant films exhibit excellent mechanical and biodegradability properties and are suitable for, among other things, biodegradable packaging, agricultural mulch films, disposable diaper liners, and trash bags.

DETAILED DESCRIPTION OF THE INVENTION

The starch-based biodegradable films of this invention are prepared from any unprocessed raw starch, including but not limited to cereal grains or root crops such as wheat, corn, rice, oat, arrowroot, pea and potato. Unlike many other starch-based "biodegradable" films, the starch used in this invention is not required to be pretreated by destructurizing or gelatinizing. Instead, dry, unprocessed raw starch is fed into the manufacturing apparatus directly. Furthermore, starches from different sources may be blended to obtain desired physical properties of the blown film product. The term "unprocessed raw starch" as used in the specification and claims is defined herein to include, but is not limited to, starches that have been neither destructurized nor gelatinized.

A copolymer of polyvinyl alcohol (PVOH) or ethylene vinyl alcohol (EVOH) provides the starch blend film with desirable structural properties including flexibility, durability, and dimensional stability. In addition, these copolymers have been shown to be substantially completely biodegradable, unlike the polyethylene and polypropylene copolymers used in blown films described in prior art.

The copolymers of EVOH or PVOH can be used in a powder or pellet form. When the pellet form is used, the raw materials will include a starch powder, one or more plasticizers in a liquid form, and copolymer pellets. In this invention, the liquids and powders can be mixed prior to their addition to the extruder or fed directly into the feed hopper. Liquid plasticizers may be metered by controlling flow rate. Commercial equipment is available to blend and feed powders and pellets over a wide variety of composition ratios of powder to pellet weights. EVOH and PVOH are commercially available with a broad range of physical properties varying predominantly in melting point, melt flow index and gas permeability. In one embodiment the invention uses PVOH with molecular weights ranging from 30 to 70 kilodaltons and from 124 to 186 kilodaltons. However, the product film exhibits the best combination of tensile strength and extensibility when PVOH in the molecular weight range of 70 to 100 kilodaltons is used. Chemically, PVOH is characterized by molecular weight and degree of hydrolysis, while EVOH is chemically differentiated by molar percent of ethylene in the copolymers.

Glycerol is included as a plasticizing agent for starch and the copolymer. Talc can also be added as a nucleating agent and lubricant during the extrusion. Alternatively, stearates, such as calcium or zinc stearate may be used as a nucleating agent. Water is added to the blend to facilitate melting of the starch and blending with the copolymer during production. The final moisture content of the film is between five (5) and eight (8) percent by weight immediately after manufacture. The water content may change on exposure to varying temperature and humidity conditions.

The proportions of starch and PVOH or EVOH may be varied in order to produce a film with specific characteristics. For blown films, starch content is in the range of 20 to 80% by weight, and preferably on the order of 50 to 70%. Useful levels of PVOH or EVOH range from 20 to 80% by weight, with the most preferable range being 30 to 50%. Optimal range of glycerol is from 10 to 20%.

The processing of the raw materials into a finished film is accomplished with a twin-screw mixer (TSM) fitted with a blown film die. A twin-screw mixer is preferred due to the high shear forces needed to break up the starch granule and completely mix it with the other components. Unlike prior methods using single screw mixers and pelletized copolymers, starch, plasticizers, and copolymers of the present invention are efficiently blended by the twin-screw mixing process to yield a highly homogeneous product. In addition, the process temperatures used are thirty to forty degrees Centigrade lower than those associated with known commercially available materials of similar formulation.

The preferable zone and die temperatures are 70°–180° C., more preferably 80°–160° C., and most preferably 90°–145° C. The preferable extruder speed depends on the size and type of commercial twin screw mixer used in the manufacture of blown film. Typical rotational speeds vary from 20 to 120 RPM. Twin screw mixer units which are used for this process, in general, can be empirically adjusted by the operator in order to produce a film with particular desired characteristics. The operator may control RPM, raw material feed rates, zone temperatures, parison internal air pressure, and other parameters.

Through constant feeding of the components into the blowing apparatus, a blown film can be continuously extruded. These formulations can also be extruded into thin film, rods, hollow tubing, or other shapes with axial symmetry. Articles that may be manufactured using the formulation and process of this invention include, but are not limited to, blown films, agricultural mulch films, trash bags, and biodegradable packaging.

The following examples further illustrate the invention but should not be construed as limiting the invention which is defined by the claims. Other formulations containing starch with alternate copolymers and additives (plasticizers, nucleating agents) are processible by this method.

EXAMPLE 1

This example describes preparation of a substantially completely biodegradable blown film from a small batch of manually prepared raw ingredients.

A mixture of dry ingredients is first prepared by combining unprocessed raw starch (200 g), powdered ethylene vinyl alcohol (200 g with a 32% ethylene copolymer ratio), and zinc stearate (20 g). A separate mixture of glycerol (137 g) and water (63 g) is prepared, added to the combined dry ingredients, and stirred to yield a semi-dry powder. The mixture is then fed into the extruder, and processed using a Brabender 42 mm Counter-rotating Twin Screw Mixer fitted with a blown film die (2.54 cm i.d. with a 0.05 cm gap). No water is added to the extrusion process through injection ports nor is water removed via venting.

The film was formed under the following conditions:

| | |
|---|---|
| Zone 1 Temp. | 115° C. |
| Zone 2 Temp. | 125° C. |
| Die Temp. | 126° C. |
| Melt Temp. | 138° C. |
| Extruder Speed | 40 RPM |
| Amps | 15 |
| Die pressure | 200 psi |

The samples were evaluated for moisture content, tensile strength, and ultimate elongation:

| | |
|---|---|
| Moisture before extrusion | 13% |
| Moisture after extrusion | 5% |
| Tensile Strength (MPa) | 5.6 |
| Ultimate Elongation | 195% |

EXAMPLE 2

The powdered ethylene vinyl alcohol with a 32% copolymer ratio used in Example 1 is substituted with powdered ethylene vinyl alcohol with a 38% copolymer ratio and processed under the same conditions as in Example 1. The samples were evaluated for moisture content, tensile strength, and ultimate elongation:

| Moisture before extrusion | 13% |
|---|---|
| Moisture after extrusion | 5% |
| Tensile Strength (MPa) | 15.1 |
| Ultimate Elongation | 338% |

EXAMPLE 3

This example describes preparation of a substantially completely biodegradable blown film from a small batch of manually prepared raw ingredients.

A mixture of dry ingredients is first prepared by combining unprocessed raw starch (200 g), powderized polyvinyl alcohol (200 g of 70–100K molecular weight), and talc (20 g). A separate mixture of glycerol (137 g) and water (63 g) is prepared, added to the combined dry ingredients, and stirred to yield a semi-dry powder. The mixture is then fed into the extruder, and processed using a Brabender 42 mm Counter-rotating Twin Screw Mixer fitted with a blown film die (2.54 cm i.d. with a 0.05 cm gap). No water was added to the extrusion process through injection ports nor is water removed via venting.

The film was formed under the following conditions:

| Zone 1 Temp. | 105° C. |
|---|---|
| Zone 2 Temp. | 105° C. |
| Die Temp. | 110° C. |
| Melt Temp. | 113° C. |
| Extruder Speed | 50 RPM |
| Amps | 7 |
| Die Pressure | 200 psi |

The sample was evaluated for moisture content and crystal melting profile by differential scanning calorimetry (DSC) before and after extrusion. In addition, the blown film sample was evaluated for physical properties, moisture content, oxygen permeability, tensile strength, and ultimate elongation:

| Moisture before extrusion | 13% |
|---|---|
| Moisture after extrusion | 5% |
| Oxygen Barrier | 1.5 g/m$^2$/24 hrs. |
| Tensile Strength | 28.8 MPa |
| Ultimate Elongation | 168% |

It is possible to scale up the amounts of ingredients utilized in Examples 1–3 to prepare biodegradable blown films continuously from raw materials. Stocks of dry and wet ingredient mixtures are held in respective storage hoppers. Mixing can be accomplished using a blending hopper system with liquid injection capabilities which feeds directly into the extrusion system. This method allows for continuous production of biodegradable blown film.

Although the invention has been shown and described with respect to exemplary embodiments thereof, various other changes, omissions and additions in form and detail thereof may be made therein without departing from the spirit and scope of the invention.

What is claimed is:

1. A method for producing biodegradable starch-based blown films, said method consisting of the steps of:
    blending together in a first mixture unprocessed raw starch, polyvinyl alcohol, and talc;
    blending together in a second mixture glycerol and water;
    combining said first mixture and said second mixture;
    and processing said combination with a single heat cycle and with a twin screw mixer into blown film.

2. A method for producing a completely biodegradable starch-based blown film, said method consisting of the steps of:
    blending together in a first mixture unprocessed raw starch, a polymeric vinyl alcohol, and a nucleating agent;
    blending together in a second mixture glycerol and water;
    combining said first mixture and said second mixture;
    and processing said combination with a single heat cycle into a blown film.

3. The method of claim 2, wherein said polymeric vinyl alcohol is polyvinyl alcohol.

4. The method of claim 2, wherein said polymeric vinyl alcohol is ethylene vinyl alcohol.

5. The method of claim 2, wherein said nucleating agent is talc.

6. The method of claim 2, wherein said nucleating agent is zinc stearate.

7. The method of claim 2, wherein said nucleating agent is calcium stearate.

8. The method of claim 2, wherein said processing utilizes a twin-screw mixer.

* * * * *